United States Patent
Kumar

(10) Patent No.: US 10,621,251 B2
(45) Date of Patent: Apr. 14, 2020

(54) AUTO-INJECTED QUERY FILTER

(71) Applicant: SAP SE, Walldorf (DE)

(72) Inventor: Viren Kumar, Vancouver (CA)

(73) Assignee: SAP SE, Walldorf (DE)

( * ) Notice: Subject to any disclaimer, the term of this patent is extended or adjusted under 35 U.S.C. 154(b) by 541 days.

(21) Appl. No.: 15/372,853

(22) Filed: Dec. 8, 2016

(65) Prior Publication Data

US 2018/0165366 A1    Jun. 14, 2018

(51) Int. Cl.
*G06F 16/9535* (2019.01)
*G06F 16/838* (2019.01)
*G06F 16/904* (2019.01)
*G06F 16/9038* (2019.01)
*G06F 16/903* (2019.01)

(52) U.S. Cl.
CPC ........ *G06F 16/9535* (2019.01); *G06F 16/838* (2019.01); *G06F 16/904* (2019.01); *G06F 16/9038* (2019.01); *G06F 16/90335* (2019.01)

(58) Field of Classification Search
CPC .............. G06F 16/9535; G06F 16/838; G06F 16/90335; G06F 16/9038; G06F 16/904
USPC .......................................................... 707/722
See application file for complete search history.

(56) References Cited

U.S. PATENT DOCUMENTS

| | | | |
|---|---|---|---|
| 6,539,371 B1* | 3/2003 | Bleizeffer | G06F 16/217 |
| 2010/0153333 A1* | 6/2010 | Rasmussen | G06F 16/907 |
| | | | 707/603 |
| 2013/0254155 A1* | 9/2013 | Thollot | G06F 16/3338 |
| | | | 707/602 |
| 2015/0032730 A1* | 1/2015 | Cialdea, Jr. | G06F 16/283 |
| | | | 707/722 |
| 2016/0104093 A1* | 4/2016 | Fletcher | G06Q 10/06393 |
| | | | 705/7.39 |
| 2017/0193016 A1* | 7/2017 | Kulkarni | G06F 16/288 |

* cited by examiner

*Primary Examiner* — Evan Aspinwall
(74) *Attorney, Agent, or Firm* — Buckley, Maschoff & Talwalkar LLC

(57) ABSTRACT

A system includes reception, from a user, elements of a database query including a dimension and a data source, determination of metadata of the data source, the metadata describing a domain of dimension values of the dimension, determination of whether to filter the database query based on the metadata, and, if it is determined to filter the database query, automatic generation of a filtered database query to limit the domain of the dimension values of a corresponding result set to less than the domain of dimension values of the dimension.

18 Claims, 7 Drawing Sheets

Dimension Settings

Data Source: ZZ1_EMPLOYEE_DATA

| Dimension | Hide | Description | Cardinality Counts | Expensive | Max. Values |
|---|---|---|---|---|---|
| City | ✓ | _____ | 980 | ☐ | _____ |
| Country | ☐ | _____ | 212 | ☐ | _____ |
| Date_SQL | ☐ | _____ | 358 | ☐ | _____ |
| Employee_ID | ✓ | _____ | +10$^4$ | ✓ | 100 |
| Gender | ☐ | _____ | 4 | ☐ | _____ |
| Name | ☐ | _____ | +10$^4$ | ✓ | 200 |

*FIG. 5*

AUTO-INJECTED QUERY FILTER

BACKGROUND

Enterprise software systems receive, generate, and store data related to many aspects of an enterprise. Users operate reporting tools to access such data and display the data in useful formats, such as in graphic visualizations. Specifically, a reporting tool may submit a query to a backend data source and present a visualization of a corresponding result set.

Typically, the user waits while the backend data source executes the received query against a stored dataset, receives a result set, and generates a corresponding visualization. The waiting time increases in direct proportion to the complexity or resource-intensiveness of the query execution. In some examples, a query which returns a large result set will require more waiting time than a similar query which returns a smaller result set. Systems are desired to address potentially unacceptable waiting times.

BRIEF DESCRIPTION OF THE DRAWINGS

FIG. 5 is an outward view of a displayed administrator interface to provide dimension metadata during dataset import according to some embodiments.

DETAILED DESCRIPTION

The following description is provided to enable any person in the art to make and use the described embodiments. Various modifications, however, will remain readily apparent to those in the art.

Generally, some embodiments provide improved backend response times by automatically filtering queries prior to submission to a backend. The queries may be filtered based on metadata which is indicative of whether execution of a given query will be unsuitably time-consuming. This metadata may include information regarding row cardinality, table size, etc.

Figure 1:
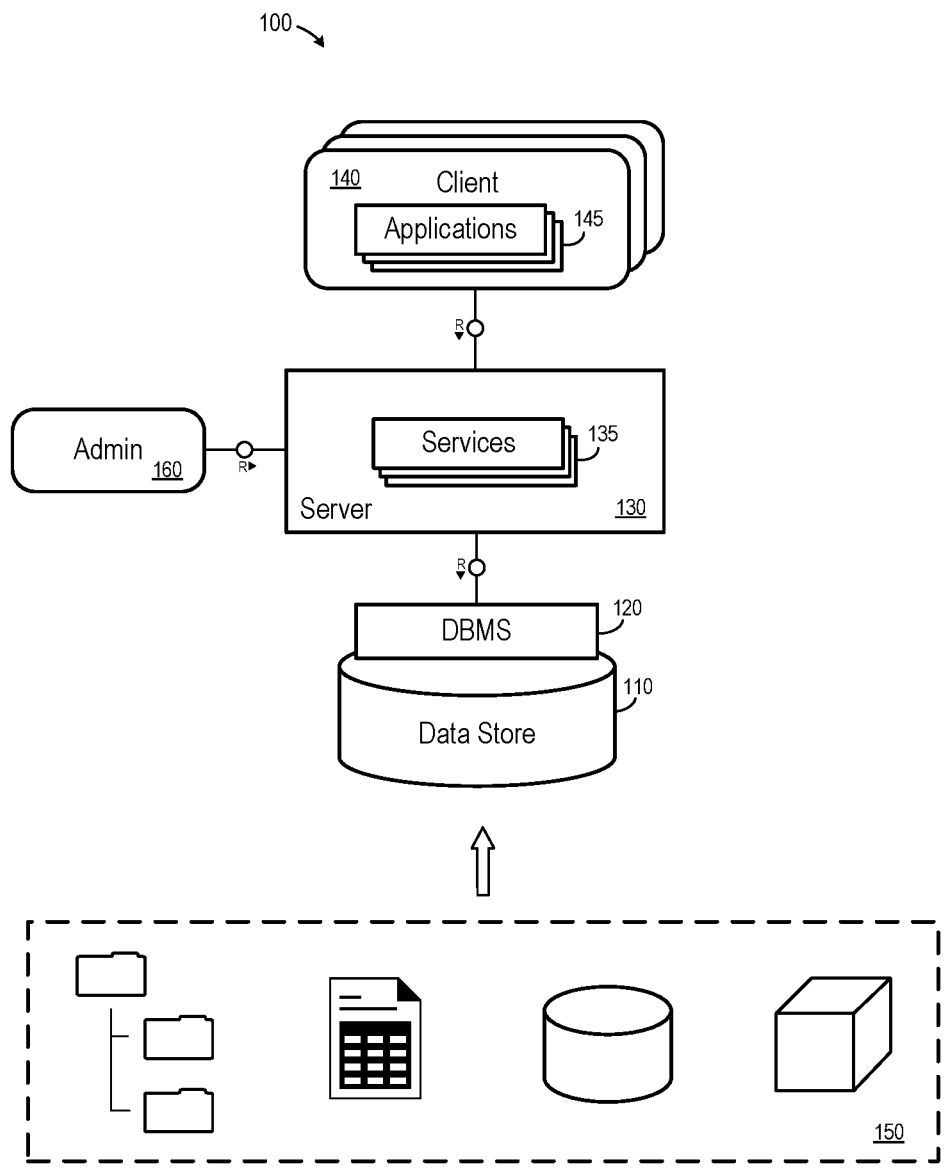
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140, applications 145, data sources 150 and administration device 160. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface, and the application 145 passes a request based on the query to one of services 135. An SQL script is generated based on the request and forwarded to DBMS 120. DBMS 120 executes the SQL script to return a result set based on data of data store 110, and the application 145 generates and displays a report/visualization based on the result set.

The query may leverage a semantic layer defining a set of objects. The semantic layer may be defined by metadata stored within data store 110 and/or a separate repository (not shown). Each object associates one or more physical entities (e.g., a physical database table, associated columns of one or more database tables, etc.) of data store 110 with user-friendly names. These objects may be classified as dimensions, along which one may perform an analysis or report (e.g., Year, Country, Product), or measures (e.g., Sales, Profit), whose values can be determined for a given combination of dimension values (e.g., 2006, U.S.A., Televisions). Accordingly, a user-generated query may include thusly-defined dimensions, dimension values and/or measures, and the metadata is used to execute the query with respect to the corresponding physical entities of data store 110. The query may also include other information such as filters.

Data sources 150 may comprise any sources of datasets which are or become known, including but not limited to database views, spreadsheets, relational databases and/or OnLine Analytical Processing cubes. According to some embodiments, new datasets from data sources 150 are occasionally stored within data store 110. Each type of data source 150 may require a particular Extract, Transform and Load process in order to store its data within data store 110. According to some embodiments, metadata describing these newly-loaded datasets is incorporated into the above-described semantic layer such that the datasets may be queried as described above. This metadata may be generated automatically and/or with the assistance of an administrator operating administration device 160, as will be described below.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC)

interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Administration device 160 may also comprise one or more devices executing program code for presenting interfaces to allow interaction with application server 130. Such interaction may comprise database administration, backup and maintenance, as well as modification or supplementation of semantic layer metadata and/or other metadata describing the data of data store 110.

Presentation of a user interface as described herein may comprise any system to render visualizations. For example, a client 140 may execute a Web Browser to request and receive a Web page (e.g., in HTML format) from application server 130 via HTTP, HTTPS, and/or WebSocket, and may render and present the Web page according to known protocols. In another example, an application 145 may comprise a user interface component and an engine component. The user interface component transmits JavaScript calls to the engine component in response to user interactions and the engine component transmits corresponding HTTP calls to server 130. The engine component receives XML, HTML and/or JavaScript from server 130 in response, and provides corresponding HTML and custom style sheet (CSS) data to the user interface component for rendering thereby. Such an implementation may allow data exchange and presentation without requiring full page reloads.

Figure 2:
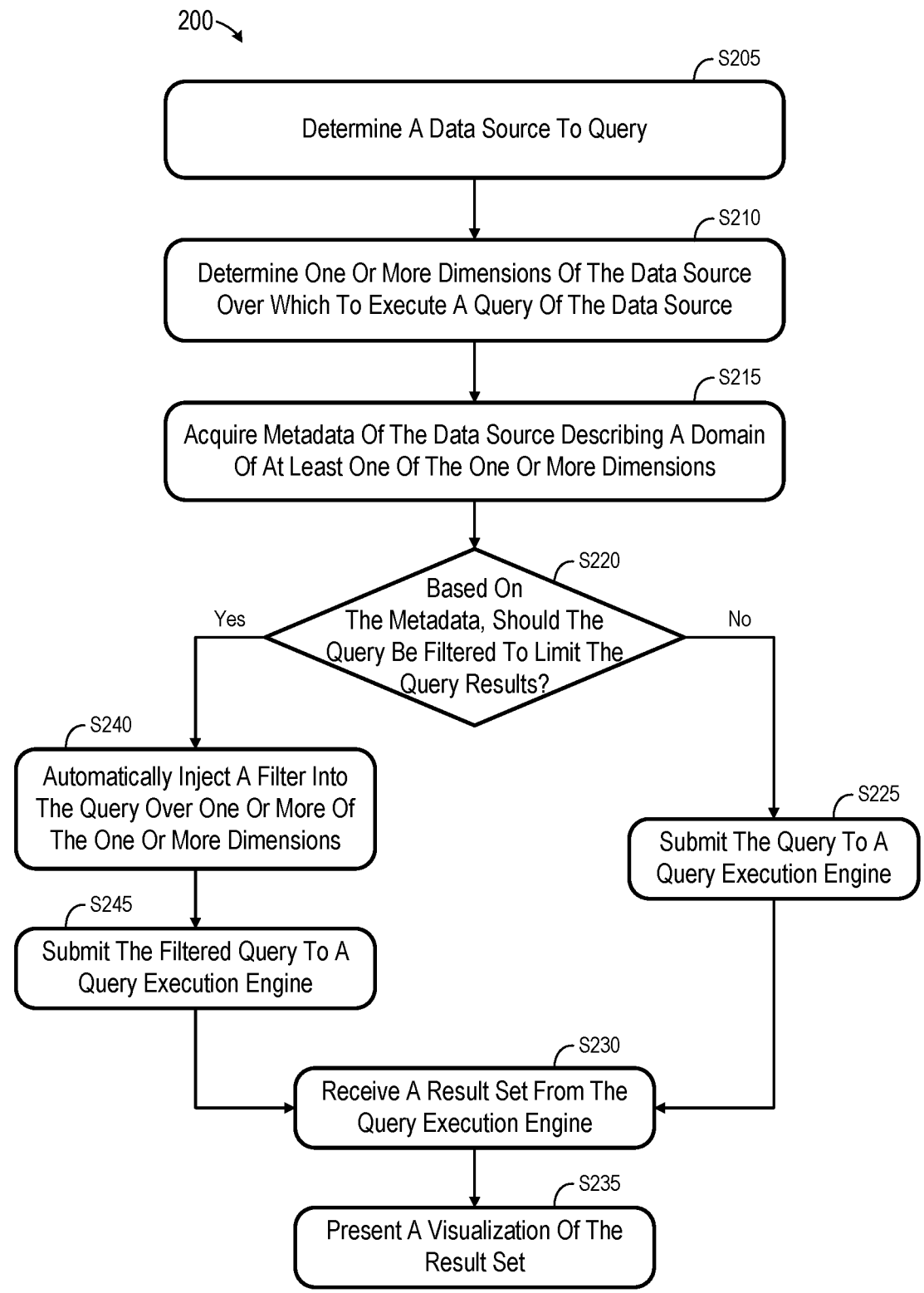
FIG. 2 is a flow diagram of a process according to some embodiments.

FIG. 2 comprises a flow diagram of process 200 according to some embodiments. Process 200 may be executed to automatically filter certain queries prior to submission to a query server based on the expected resource consumption required to execute the certain queries.

In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a data source to query is determined at S205. The data source may comprise a table stored in data store 110 according to some embodiments. Next, at S210, one or more dimensions are determined over which to execute a query of the data source. Accordingly, the data source and the one or more dimensions may be specified in a query submitted by a user of a client device 140.

Figure 3:
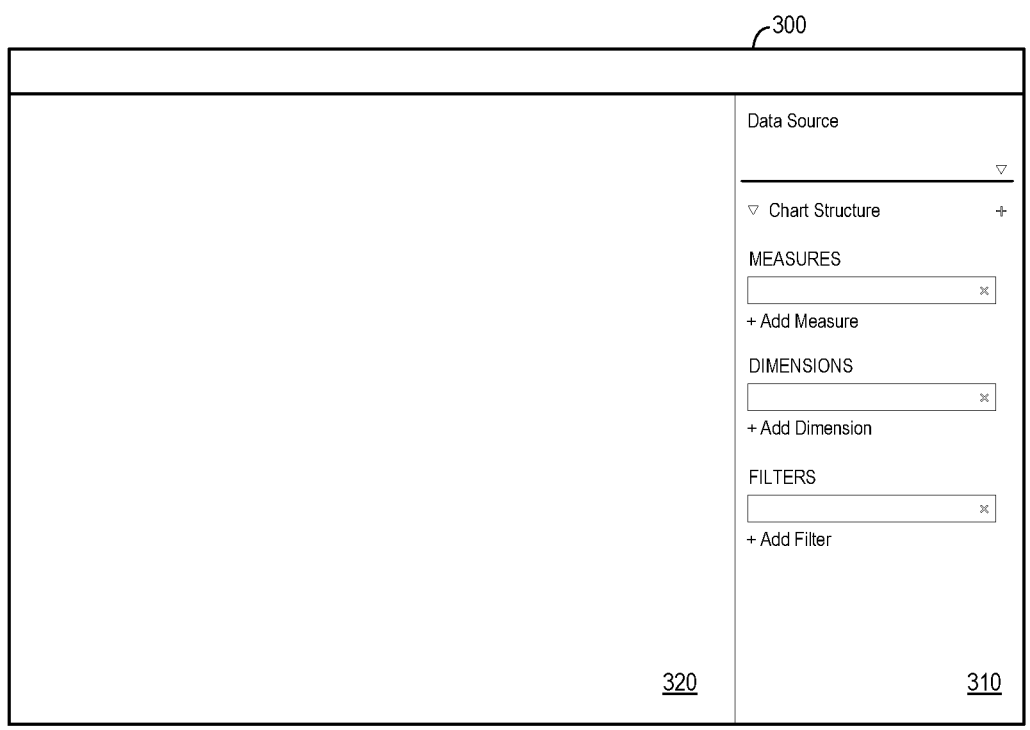
FIG. 3 is an outward view of a displayed user interface to generate a data visualization according to some embodiments.

FIG. 3 illustrates interface 300 to receive a query from a user according to some embodiments. Embodiments are not limited to interface 300. Interface 300 may comprise a Web page provided by server 130 in response to a request from a Web browser application 145 executing on client 140. Any client application 145 may be used to display interface 300, which is not limited to Web-based formats.

Interface 300 includes query definition area 310 to receive elements of a query from a user. Area 310 includes fields which allow a user to specify a data source, a chart structure (e.g., pie, line, bar, etc.), one or more measures, one or more dimensions, and one or more query filters.

Figure 4:
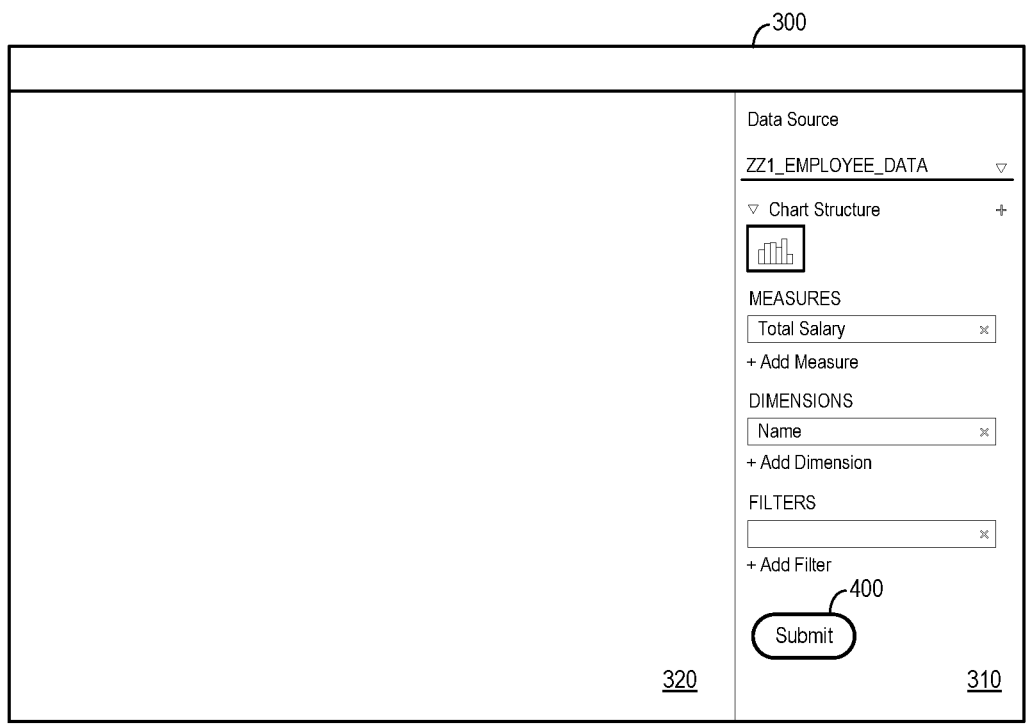
FIG. 4 is an outward view of a displayed user interface to generate a data visualization according to some embodiments.

FIG. 4 illustrates interface 300 after input of query elements into area 310 according to some embodiments. A user has selected a data source (i.e., ZZ1_EMPLOYEE_DATA), a bar chart structure, the measure Total Salary and the dimension Employee Name. Accordingly, area 310 defines a query which will return the value of the measure Total Salary for each Name represented in the data source ZZ1_EMPLOYEE_DATA, with each returned value being represented by a bar of a bar chart visualization. With reference to process 200, the data source ZZ1_EMPLOYEE_DATA is determined at S205 and the dimension Name is determined at S210 in response to user selection of Submit icon 400.

Metadata of the data source is acquired at S215. The metadata indicates a domain of the one or more dimensions of the data source determined at S210. The domain of a dimension may be useful in determining whether a query over the dimension will be computationally-expensive and/or time-consuming. For instance, if the metadata specifies that the dimension includes one million unique values, then it may be determined that execution of a query over the dimension may be time-consuming. In some embodiments, the metadata simply includes a flag which specifies that the domain of the dimension would result in computationally-expensive queries over the dimension.

The metadata may comprise statistics which are automatically determined by server 130 and/or specified by an administrator via administration device 160. FIG. 5 illustrates interface 500 which may be displayed by administration device 160 and manipulated by an administrator in order to specify metadata associated with various dimensions of a data source according to some embodiments. It will be assumed that the data source ZZ1_EMPLOYEE_DATA has been imported into data store 110 with the dimensions illustrated in interface 500. Using the provided fields of interface 500, the administrator may generate metadata specifying that certain dimensions be hidden from users, as well as descriptions of the dimensions.

Interface 500 also specifies the cardinality counts of each dimension, which may be automatically determined by server 130. Based on these cardinality counts, the administrator may use the "Expensive?" checkboxes to generate metadata specifying that execution of a query over a dimension may be expensive. Moreover, for such expensive dimensions (or any other dimension), the administrator may specify a maximum number of values of a dimension over which to execute a query, regardless of the actual number of values of the dimension. The metadata may be pushed to the client 140 by server 130 at some time point prior to process 200 (e.g., after loading the data source into data store 110) or in response to submission of the query.

At S220, it is determined, based on the metadata, whether the query should be filtered to limit the query results. This determination may comprise a determination of whether the user is expected to wait an unsuitably long time to receive the results of the query. In addition to being based on the metadata indicating a domain of the dimensions of the query, this determination may be based on a throughput between the client 140 and server 130, a known processing power/speed of server 130, a predetermined threshold waiting time, user preferences, and/or other factors.

According to some embodiments, the determination at S220 is based on whether the metadata indicates that the domain is "Expensive" as described with respect to FIG. 5. The determination may therefore be as simple as checking the metadata for the Expensive flag.

If it is determined that the query should not be filtered, flow proceeds to S225 to submit the query to a query execution engine associated with the data source. According to the present example, the following generic SQL query may be submitted at S225:
SELECT SUM(Salary)
FROM Employee Data
GROUP BY Name The query may be submitted at S225 in any suitable query format. According to an embodiment using JavaScript Object Notation (JSON):

```
{
    "Analytics": {
        "DataSource": {
            "InstanceId": "6e469e64-94b1-afe1-1de5-9567b9b8d3b8",
            "ObjectName": "EMPLOYEE DATA",
            "PackageName":
            "FPA_EXPORT.PACIFICA.sap.epm.external",
            "SchemaName": "_SYS_BIC",
            "Type": "View"
        },
        "Definition": {
            "Dimensions": [{
                "Attributes": [{
                    "Name": "[NAME].[NAME]",
                    "Obtainability": "Always"
                }],
                "Axis": "Rows",
                "Name": "NAME",
                "NonEmpty": false,
                "ReadMode": "BookedAndSpaceAndState",
                "ResultStructure": [{
                    "Result": "Members",
                    "Visibility": "Visible"
                }]
            },
            {
                "Axis": "Columns",
                "Members": [{
                    "Aggregation": "SUM",
                    "MemberOperand": {
                        "AttributeName": "Measures",
                        "Comparison": "=",
                        "Value": "SALARY"
                    },
                    "NumericPrecision": 10,
                    "NumericScale": 3,
                    "NumericShift": 0,
                    "Visibility": "Visible"
                }],
                "Name": "CustomDimension1",
                "NonEmpty": false,
                "ReadMode": "BookedAndSpaceAndState"
            }],
            "DynamicFilter": { },,
            "Sort": [ ]
        },
        "Language": "en"
    },
    "Options": [ ]
}
```

Per conventional operation, server 130 may receive the query, generate an SQL script based on the query and on the metadata defining the dimensions and measures of the query, and forward the script to DBMS 120. DBMS 120 executes the SQL script to return a corresponding result set to an application 145 based on data of data store 110 (e.g., the data associated with data source ZZ1_EMPLOYEE_DATA) at S230, and a visualization of the result set is presented to the user (e.g., in area 320 of interface 300) at S235. The visualization may be rendered on server 130 or may be transmitted to client 140 as XML, HTML and JavaScript for rendering thereon as described above.

However, if it is determined at S220 that the query should be filtered, flow proceeds to S240 to automatically inject a filter into the query. The filter is intended to filter over the any of the one or more dimensions which has been identified as computationally-expensive.

The filter may limit the results to a specified number of rows. In some embodiments, the number of rows are specified in the acquired metadata (e.g., as max values) associated with the expensive query dimensions. According to an SQL-based embodiment, the query may be filtered as follows:

```
SELECT SUM(Salary)
FROM Employee Data
GROUP BY Name
LIMIT EMPLOYEE 500
```

Some implementations might not support filters as described above, but may support filtering over a range of specific dimension values. According to these implementations, S225 may comprise querying the query execution engine for the nth and (n+x)th values of the expensive dimension, where x is the number of desired rows in the result set. A corresponding SQL query according to some embodiments is:

```
SELECT SUM(Salary)
FROM Employee
WHERE Name>"Alexander Alameda" AND Name<"Perry Peterson"
GROUP BY Name
```

A corresponding filtered JSON query may be formatted as follows:

```
{
    "Analytics": {
        "DataSource": {
            "InstanceId": "6e469e64-94b1-afe1-1de5-9567b9b8d3b8",
            "ObjectName": "EMPLOYEE DATA",
            "PackageName":
            "FPA_EXPORT.PACIFICA.sap.epm.external",
            "SchemaName": "_SYS_BIC",
            "Type": "View"
        },
        "Definition": {
            "Dimensions": [{
                "Attributes": [{
                    "Name": "[NAME].[NAME]",
                    "Obtainability": "Always"
                }],
                "Axis": "Rows",
                "Name": "NAME",
                "NonEmpty": false,
                "ReadMode": "BookedAndSpaceAndState",
                "ResultStructure": [{
                    "Result": "Members",
                    "Visibility": "Visible"
                }]
            },
            {
                "Axis": "Columns",
                "Members": [{
                    "Aggregation": "SUM",
                    "MemberOperand": {
                        "AttributeName": "Measures",
                        "Comparison": "=",
                        "Value": "SALARY"
                    },
                    "NumericPrecision": 10,
                    "NumericScale": 3,
                    "NumericShift": 0,
                    "Visibility": "Visible"
                }],
                "Name": "CustomDimension1",
                "NonEmpty": false,
                "ReadMode": "BookedAndSpaceAndState"
            }],
            "DynamicFilter": {
                "Selection": {
                    "Operator": {
                        "Code": "And",
                        "SubSelections": [{
                            "SetOperand": {
                                "Elements": [{
                                    "Comparison":
                                    "BETWEEN",
                                    "High": "Alexander Alameda",
                                    "Low": "Perry Peterson"
                                }],
                                "FieldName":
                                "[NAME].[NAME]"
                            }
                        }]
                    }
                },
                "Sort": [ ]
            },
            "Language": "en"
        },
        "Options": [ ]
    }
}
```

The filtered query is submitted to the query execution engine at S245 and flow proceeds through S230 and S235 as described above.

Figure 6:
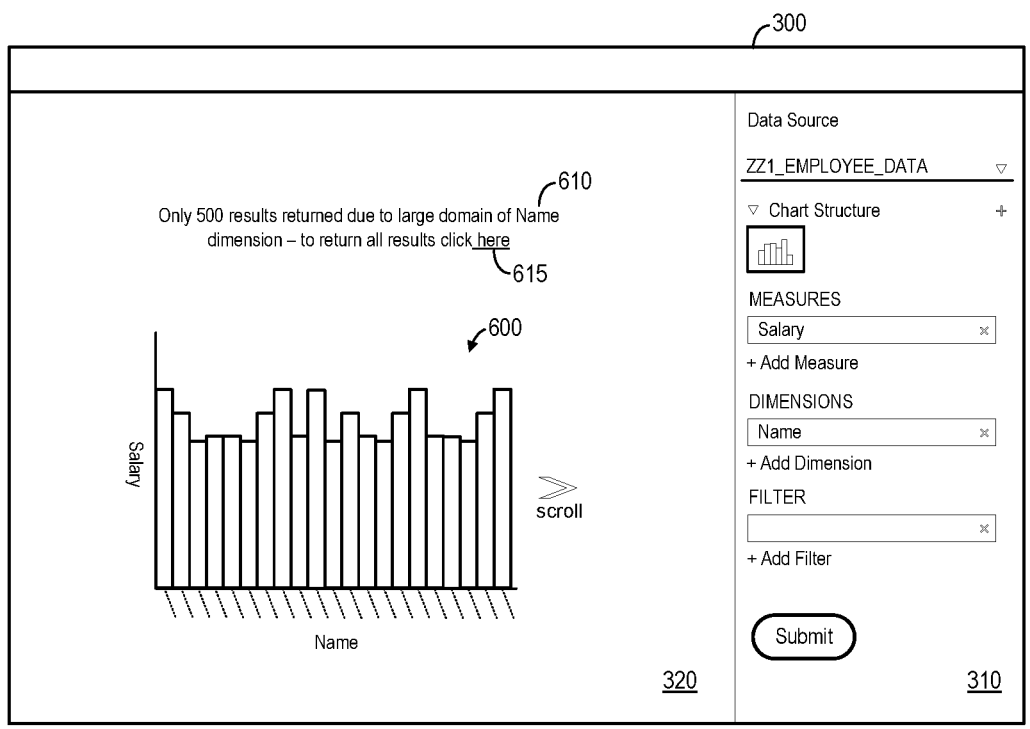
FIG. 6 is an outward view of a displayed user interface to generate a data visualization according to some embodiments.

FIG. 6 illustrates interface 300 presenting visualization 600 of a result set at S235 according to some embodiments. Visualization 600 includes a subset of all results which would have been retrieved by an unfiltered query based on the dimension and measure specified in area 310. Visualization 600 includes a scroll icon to view the returned filtered results which are too numerous to be presented in area 320. In some embodiments, visualization 600 may be formatted such that graphical visualizations of all the returned filtered results.

Visualization 600 is accompanied by text 610 indicating that the user-submitted query has been filtered and including link 615. Link 615 may be selected to submit an unfiltered query to the query execution engine as described above with respect to S225 and to receive a corresponding result set and visualization at S230 and S235, respectively. Embodiments are not limited to text 610.

Figure 7:
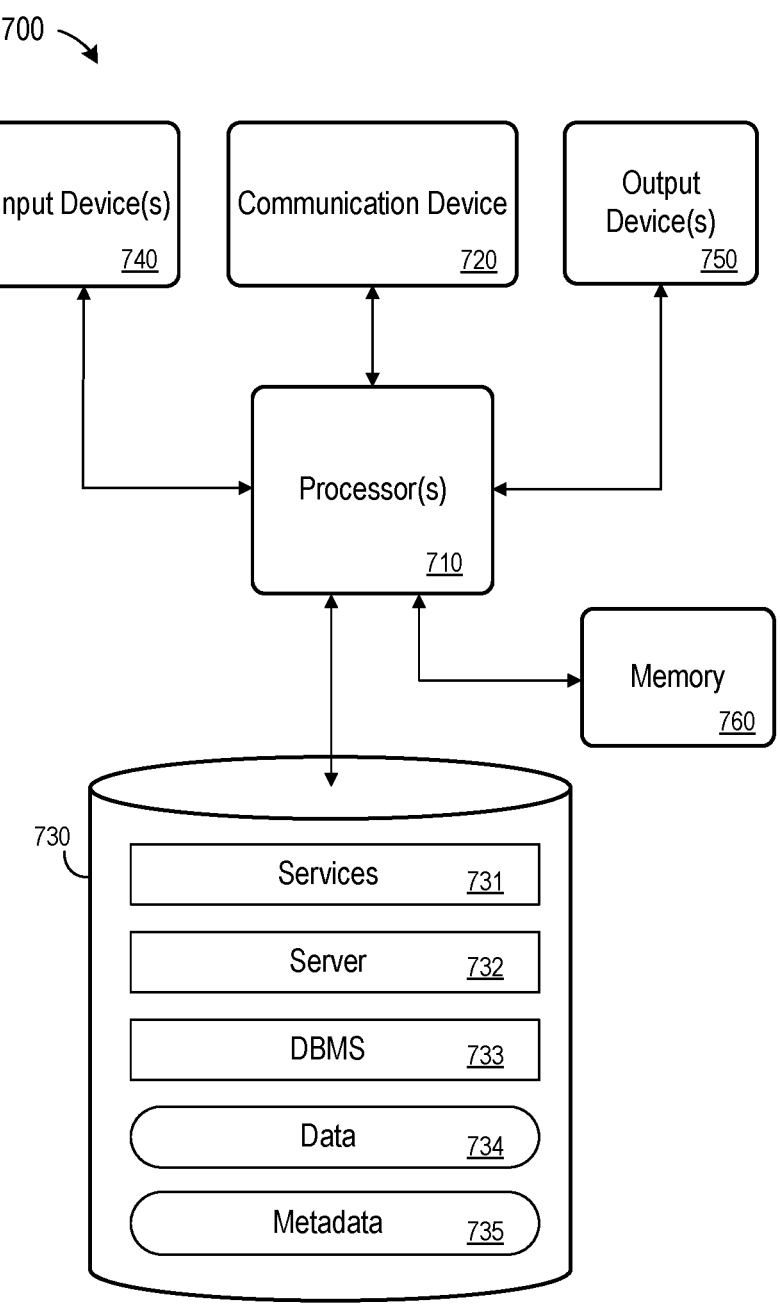
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of server 130, DBMS 120 and data store 110 of FIG. 1 in some embodiments. Apparatus 700 may include other unshown elements according to some embodiments.

Apparatus 700 includes processor(s) 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Services 731, server 732 and DBMS 733 may comprise program code executed by processor 710 to cause apparatus 700 to perform any one or more of the processes described herein. Embodiments are not limited to execution of these processes by a single apparatus.

Data 734 and metadata 735 (either cached or a full database) may be stored in volatile memory such as memory 760. Metadata 735 may include information regarding dimensions, dimension values, dimension domains, and measures associated with the data sources stored within data 734. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a user device to:
        receive, from a user, elements of a database query including a dimension and a data source;
        determine metadata of the data source, the metadata comprising information describing a domain of dimension values of the dimension;
        determine whether to filter the database query based on the domain of dimension values of the dimension; and
        if it is determined to filter the database query, automatically generate a filtered database query to limit the domain of the dimension values of a corresponding result set to less than the domain of dimension values of the dimension; and
    a server device to:
        receive the filtered database query;
        execute the filtered database query; and
        provide the result set corresponding to the filtered database query to the user device.

2. A system according to claim 1, wherein providing of the result set corresponding to the filtered database query to the user device comprises:
    generation of a visualization of the result set; and
    transmission of the visualization to the user device.

3. A system according to claim 2, wherein the generated visualization comprises XML code and JavaScript code, and the user device further to:
    generate HTML code and CSS code based on the XML code and JavaScript code; and
    display the visualization.

4. A system according to claim 1, the user device further to:
    present a visualization of the result set;
    present, contemporaneously with presentation of the result set, an indication that the result set is limited, and
    present, contemporaneously with presentation of the result set, a control selectable by the user to cause submission of the database query to the server device.

5. A system according to claim 1, wherein the information describing a domain of dimension values of the dimension comprises a flag indicating that query execution over the dimension is resource-intensive, and
    wherein the determination of whether to filter the database query comprises identification of the flag.

6. A system according to claim 1, wherein the information describing a domain of dimension values of the dimension comprises an indication of the cardinality of the dimension values, and
    wherein the determination of whether to filter the database query comprises determination of whether the cardinality exceeds a predetermined threshold.

7. A system comprising:
    a user device comprising:
        a first memory storing processor-executable process steps; and
        a first processor to execute the processor-executable process steps to cause the user device to:
            receive a database query including a dimension and specifying a remote data source;
            determine metadata of the remote data source, the metadata comprising information describing a domain of dimension values of the dimension;
            determine whether to apply a filter to the database query based on the domain of dimension values; and
            if it is determined to apply a filter to the database query, automatically generate a filtered database query based on the database query, the filtered database query to limit the domain of the dimension values of a corresponding result set of the database query to less than the domain of dimension values of the dimension; and
    a server device comprising:
        a second memory storing processor-executable process steps; and
        a second processor to execute the processor-executable process steps to cause the server device to:
            receive the filtered database query;
            execute the filtered database query against the remote data source; and
            provide a result set corresponding to the filtered database query to the user device.

8. A system according to claim 7, wherein determination of whether to apply a filter to the database query comprises estimation, based on the information of the metadata, of whether a resource-usage or processing time of execution of the database query will be greater than an acceptable amount.

9. A system according to claim 7, wherein determination of whether to apply a filter to the database query comprises determination, based on the information of the metadata, of a domain of dimension values of each dimension specified in the database query.

10. A system according to claim 7, wherein the information of the metadata comprises a flag indicating that query execution over a dimension of the database query is resource-intensive, and
    wherein the determination of whether to apply a filter to the database query comprises identification of the flag.

11. A system according to claim 7, wherein the information of the metadata comprises an indication of the cardinality of the dimension values of one or more dimensions of the database query, and
    wherein the determination of whether to apply a filter to the database query comprises determination of whether the cardinality of one or more dimensions of the database query exceeds a predetermined threshold.

12. A system according to claim 11, wherein, automatic generation of the filtered database query comprises generating a filter over the one or more dimensions of the database query having a cardinality exceeding the predetermined threshold.

13. A computer-implemented method comprising:
    receiving a database query including a dimension and specifying a remote data source;
    determining metadata of the remote data source, the metadata comprising information describing a domain of dimension values of the dimension;
    determining whether to apply a filter to the database query based on the domain of dimension values; and
    if it is determined to apply a filter to the database query, automatically generating a filtered database query based on the database query, the filtered database query to limit the domain of the dimension values of a corresponding result set of the database query to less than the domain of dimension values of the dimension; and
    transmitting the filtered database query to a query server associated with the remote data source.

14. A method according to claim 13, wherein determining whether to apply a filter to the database query comprises estimating, based on the information of the metadata, of whether a resource-usage or processing time of execution of the database query will be greater than an acceptable amount.

15. A method according to claim 13, wherein determining whether to apply a filter to the database query comprises determination, based on the information of the metadata, of a domain of dimension values of each dimension specified in the database query.

16. A method according to claim 13, wherein the information of the metadata comprises a flag indicating that query execution over a dimension of the database query is resource-intensive, and
    wherein determining whether to apply a filter to the database query comprises identification of the flag.

17. A method according to claim 13, wherein the information of the metadata comprises an indication of the cardinality of the dimension values of one or more dimensions of the database query, and
    wherein determining whether to apply a filter to the database query comprises determining whether the cardinality of one or more dimensions of the database query exceeds a predetermined threshold.

18. A method according to claim 17, wherein automatically generating the filtered database query comprises generating a filter over the one or more dimensions of the database query having a cardinality exceeding the predetermined threshold.

* * * * *